UNITED STATES PATENT OFFICE.

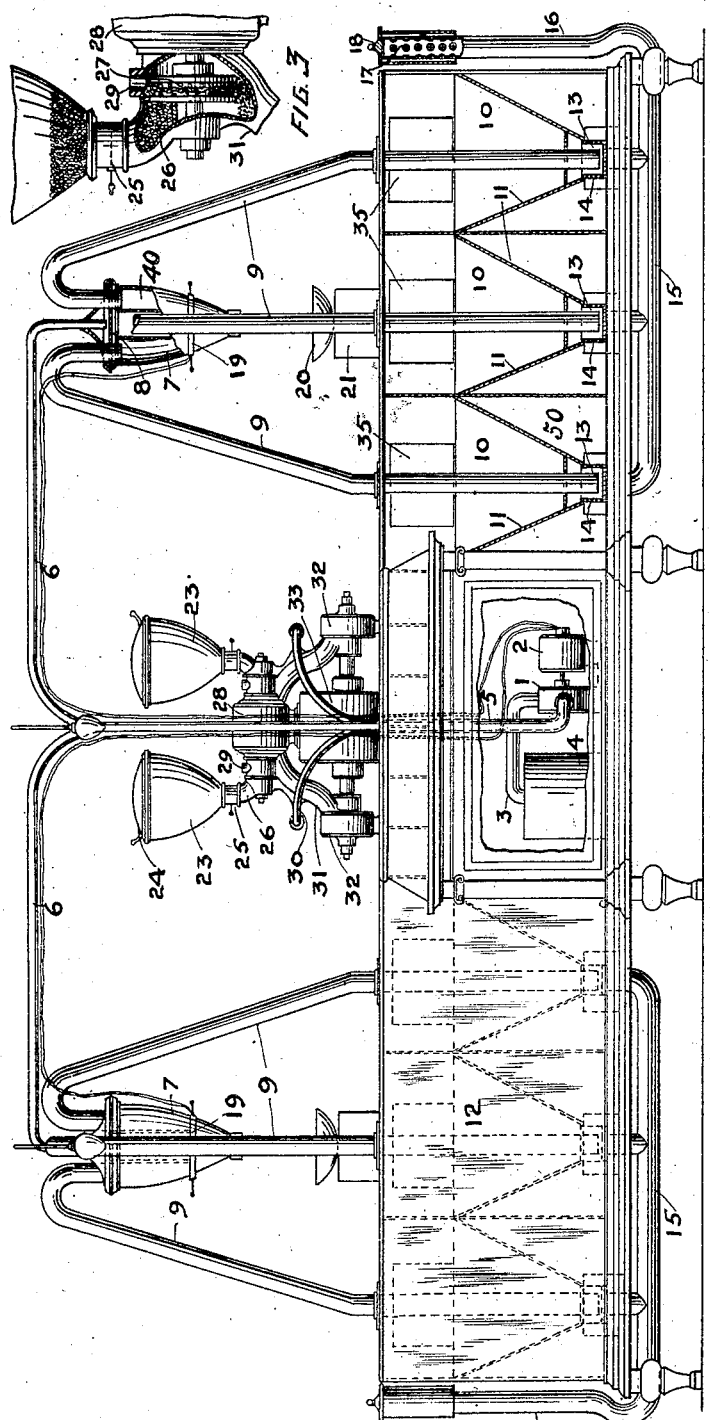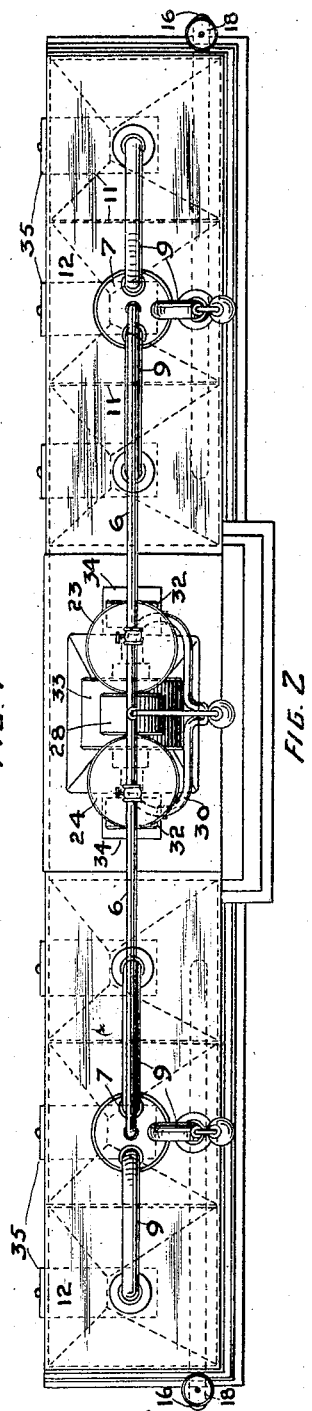
F. F. WEAR.
PNEUMATIC CONVEYER.
APPLICATION FILED APR. 27, 1909.
981,041.
Patented Jan. 10, 1911.

FRANK F. WEAR, OF SAN FRANCISCO, CALIFORNIA.

PNEUMATIC CONVEYER.

981,041.

Specification of Letters Patent. Patented Jan. 10, 1911.

Application filed April 27, 1909. Serial No. 492,534.

*To all whom it may concern:*

Be it known that I, FRANK F. WEAR, a citizen of the United States, residing at San Francisco, in the county of San Francisco and State of California, have invented new and useful Improvements in Pneumatic Conveyers, of which the following is a specification.

The present invention relates to improvements in coffee display counters.

One object of the invention is to properly display roasted coffee of several grades or kinds in an attractive manner, while preserving its strength and aroma equally as well as though it were put up in sealed air-tight cans or jars.

Coffee, when roasted, becomes very dry and brittle, and, therefore, when contained in wooden compartments of any kind, it absorbs moisture, and will also absorb objectionable odors that may be present, resulting in a deterioration of the flavor and in an unwholesome product. Roast coffee especially deteriorates when kept in open-topped receptacles, such as sacks, cans, or metal bins, for, in such cases, not only does the delicate aromatic substance of the coffee ascend and escape in the open air, but the dust from the store, dead flies, and all kinds of objectionable substances, find their way into such receptacles and settle and mix with the coffee. Moreover, the coffee, when left in such receptacles in easy reach of the public, is subjected to indiscriminate handling, even by dirty or diseased individuals. A further disadvantage of such containers is that, since the container is generally refilled before all of the coffee has been extracted therefrom, the coffee in the bottom of the container is seldom disturbed, and therefore becomes stale and rancid and ruins the flavor of the fresh coffee afterward supplied to the container. Consequently, if a fine flavored or high grade coffee is placed in a vessel containing poor grade coffee, in a short time both are of the one grade, and that a poor one.

The present invention is intended to avoid the above defects.

A further object of the invention is to separate, from the coffee berries, foreign substances such as stones, nails, and the like, also imperfect or partially roasted coffee beans. Further, all coffee, when being gathered, becomes more or less contaminated with soil, or dirt in general, which is retained in the slitted center of the flat side of the berry.

A further object of the invention is to purify the coffee from such dirt, before final grinding, and also to remove the chaff.

In the accompanying drawing, Figure 1 is a front view of my improved coffee display counter; Fig. 2 is a plan view of the same; Fig. 3 is an enlarged sectional view of a breaker; Fig. 4 is a plan view of an electric switch closed by a plate.

Referring to the drawing, 1 indicates a suction pump, here shown as of the centrifugal type, driven by an electric motor 2. It discharges by a pipe 3 into a refuse box 4, from which the air escapes, leaving in said box refuse matter recovered from the coffee. To said suction pump leads a vertical pipe 5, which at the top divides into two horizontal branches 6, which extend to points above the terminal portions of the counter, and then lead downward into the tops of receiver 7, above coarse screens 8. Discharging downwardly into each receiver, below the screen 8 therein, and into individual chambers 40 in said receiver, are pipes 9, three being here shown for each receiver, each leading upward from a point near the bottom of a compartment 10. Said compartments 10 are formed by walls 11 and partitions 12 of glass, so that the various grades of coffee therein can be readily inspected and compared from the outside. The bottom of each pipe 9 is inclosed within a box 13 having perforated walls 14, which allow air to enter and pass into the lower end of the corresponding pipe 9. The perforations in the wall of a box facilitate the suction of the coffee berries by the suction pipe 9, as they permit air to enter behind said coffee berries which fall into the box. Were these walls unperforated, the lifting suction would be diminished, because the air would not be able to pass so freely through the pile of coffee berries in the hopper shaped container, and much of the suction would have to be utilized to draw the air through this pile of coffee berries. The air is brought to each box 13 by a branch conduit 15 leading from a main conduit 16, which leads downward from a point near the top of the counter, and is provided at the top with screens 17 covered by a tubular cover 18. As shown in dotted lines in Fig. 2 the branches 16 enter the space 50 outside the compartments 10 and also outside the perforated boxes 13. It is then drawn through the perforated wall of said boxes. By this arrangement the air, instead of being taken from a point near the floor, where it is the most impure, is taken from a point near the top of the counter. Each compartment converges toward the bottom, in which is situated the end of the pipe 9, so that, as coffee is withdrawn from the compartment, the remainder always surrounds the bottom of the suction pipe 9.

By the above arrangement, dust and small particles which will pass through the coarse screens 8, will be drawn into the refuse box 4, thus cleaning the coffee. Also the suction can be so arranged that, while powerful enough to draw up the perfect and properly roasted coffee berries, it will not fully raise imperfect or partially roasted berries, or heavy foreign substances such as rocks and nails. These therefore, drop back into the bottom of the bin, when the suction ceases, thus avoiding the danger of breaking the grinding machinery.

Each chamber 40 is closed near the bottom by a gate 19, which is opened to allow the coffee to fall from the receiver into a bag or other receptacle, which may be supported in a scoop 20 supported upon scales 21. These scales may be automatic to indicate at all times the weight in the bag or scoop, but as this mechanism is common in similar relations, it is not herein disclosed. The gate 19, when closing, is arranged to close an electric circuit 22 through the motor 2, so that, after the receiver has been emptied of coffee and the gate is again closed, the suction pump is again started, and coffee again flows into the receiver. After the receptacle is filled up to the end of the pipe 9 leading thereto, the coffee closes said end so that there is no further suction in said pipe, and the berries already in the pipe drop to the bottom thereof. The opening of the gate 19 breaks the circuit through the motor and stops the suction, allowing the coffee to drop from the receptacle. The coffee is then transferred by hand from the scoop 20 into one of two glass hoppers 23, each closed at the top by a lid 24 and at the bottom by a gate 25. From each hopper a conduit 26 leads to a primary breaker 27, both of said breakers being carried on the ends of the shaft of an electric motor 28. While passing through this breaker, the coffee is subjected to a current of air drawn through an opening 29, and flowing by a pipe 30 to the suction pump. When the coffee or berry is broken into comparatively large pieces, the dust or soil which has heretofore clung to the berry is loosened therefrom, and is discharged and carried to the refuse box 4. Also this preliminary breaking releases the chaff, and the air currents carry the same by the pipes 30 to the refuse box. This chaff is very objectionable as it spoils the taste and appearance of the coffee, and the extraction of the chaff therefore renders the coffee more salable. From each breaker, a conduit 31 conducts the broken coffee to a grinder 32, both of said grinders 32 being mounted upon the ends of the shaft of a second electric motor 33. The coffee is discharged from said grinders into a receiving can 34. Each compartment 10 is provided at the back with a door 35 for replenishing the compartment with coffee.

It will be seen that, with the above apparatus, the aroma of the coffee cannot escape, nor can the coffee absorb moisture or any objectionable odors, since the upper portion of each compartment is air tight, and, on account of the arrangement of the pipes 15 and 9, there is no current of air passing into the compartment. The coffee is always drawn from the bottom, and therefore there is no residuum of coffee remaining for a long period of time in the compartment, which would become stale and rancid. No foreign matter can enter the receptacle for the coffee and thus become mixed therewith, nor can it be handled indiscriminately. Furthermore, in the process of grinding, the coffee berries are cleaned of chaff, dust and soil which may have clung to them from the time when they were first gathered. At the same time the coffee is easily inspected from the front.

I claim:—

1. The combination of a plurality of containers, a pipe for each container leading from the bottom thereof, a receiver to which all of said pipes lead, divided into compartments into which the pipes respectively enter, a second pipe leading from the top of said receiver and communicating with all of the compartments, means for screening the entrance to said second pipe from the several compartments, a suction pump to which the second pipe leads and a common discharge pipe from all of said compartments, substantially as described.

2. The combination of a suction pump, a pipe leading thereto, a receiver from which the pipe leads, a container, a pipe leading to said receiver from a point near the bottom of said container, and a box at the bottom of the container having an open top, the bottom of the container being sloped toward the box so that the contents thereof are delivered to the box by gravity, the walls of said box being perforated and surrounding the lower end of the latter pipe, substantially as described.

3. The combination of a suction pump, a pipe leading thereto, a receiver from which the pipe leads, a container, a pipe leading to said receiver from a point near the bottom of said container, a box at the bottom of the container having an open top, the bottom of the container being sloped toward the box so that the contents thereof are delivered to the box by gravity, the walls of said box being perforated and surrounding the lower end of the latter pipe, the bottom of the box being also perforated, and a pipe for conducting air to the bottom of said box, substantially as described.

4. The combination of a suction pump, a pipe leading thereto, a receiver from which the pipe leads, a container, a pipe leading to said receiver from a point near the bottom of said container, a box at the bottom of the container having an open top, the bottom of the container being sloped toward the box so that the contents thereof are delivered to the box by gravity, the walls of said box being perforated and surrounding the lower end of the latter pipe, the bottom of the box being also perforated, a pipe for conducting air downward to the bottom of said box, said pipe having perforations at its upper end, and a screen covering said perforations, substantially as described.

5. The combination of a container, a pipe leading from the bottom thereof, a receiver to which said pipe leads, a second pipe leading from the top of said receiver, a screen in the receiver between the ends of the two pipes, a suction pump to which the second pipe leads, a gate closing the bottom of the receiver, an electric motor for the suction pump, an electric circuit through the motor and means operated by the closing of the gate, for closing said electric circuit, substantially as described.

In testimony whereof I have hereunto set my hand in the presence of two subscribing witnesses.

FRANK F. WEAR.

Witnesses:
 FRANCIS M. WRIGHT,
 D. B. RICHARDS.